UNITED STATES PATENT OFFICE.

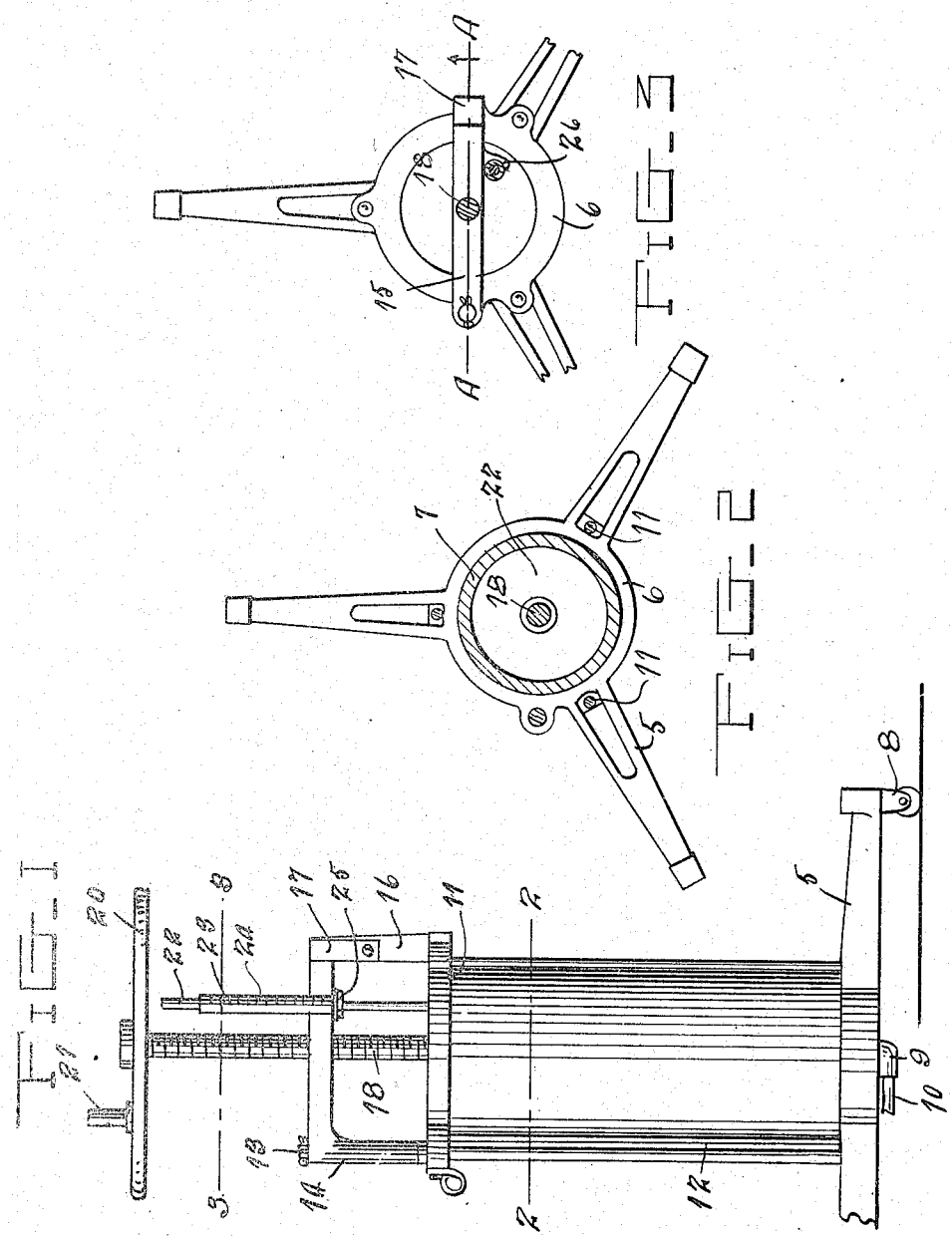

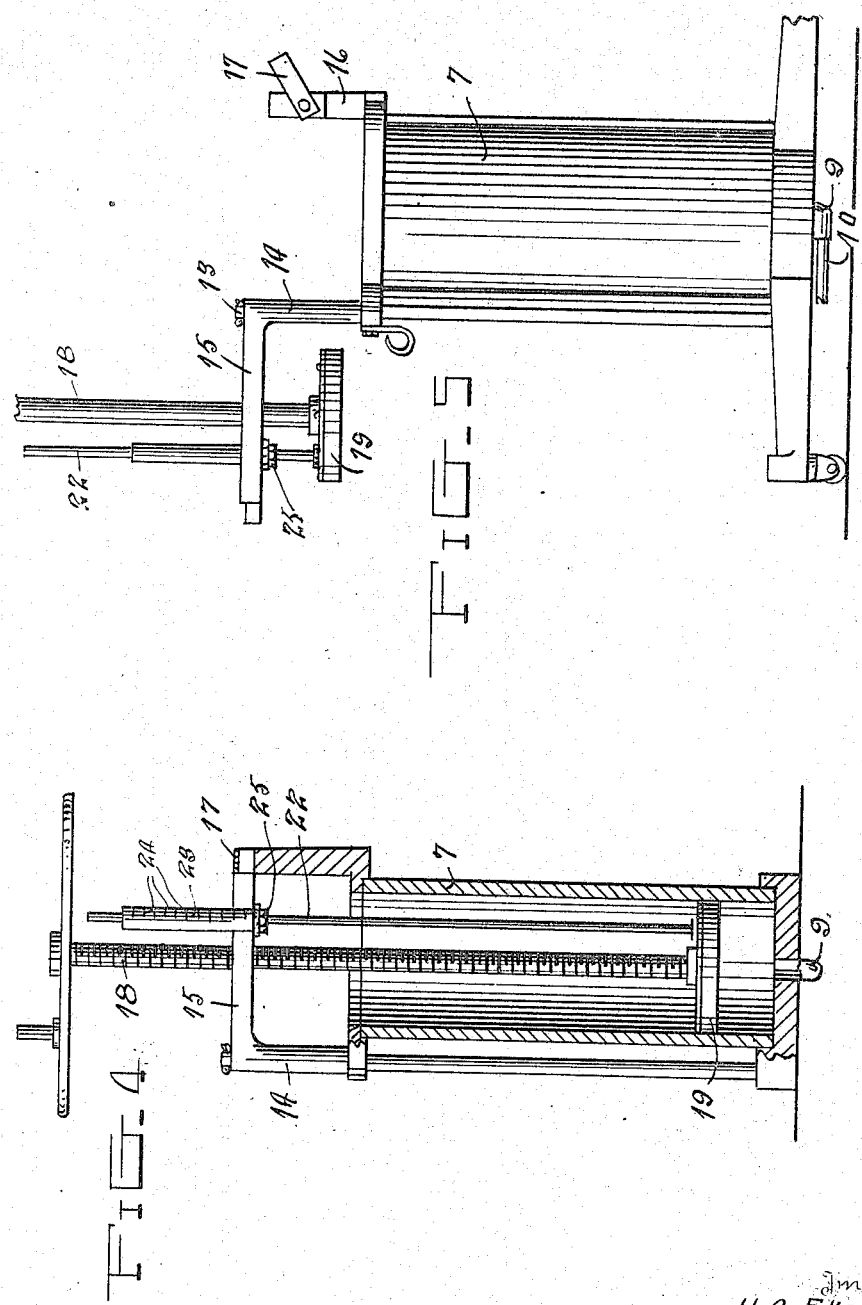

HELMER O. EKERN AND WILLIAM L. EKERN, OF FLANDREAU, SOUTH DAKOTA.

GREASE-GUN.

1,129,184.

Specification of Letters Patent.

Patented Feb. 23, 1915.

Application filed May 1, 1914. Serial No. 835,682.

*To all whom it may concern:*

Be it known that we, HELMER O. EKERN and WILLIAM L. EKERN, citizens of the United States, residing at Flandreau, in the county of Moody and State of South Dakota, have invented certain new and useful Improvements in Grease-Guns, of which the following is a specification.

This invention relates to grease guns and is specially designed for forcibly ejecting heavy oils and greases, in predetermined quantities, through a suitable flexible hose.

An object of the invention is the provision of a device of this character of generally improved and simplified construction, which shall be inexpensive to manufacture and efficient and durable in use.

Another object is the provision of simple and efficient means for indicating the quantity of material ejected from the grease gun.

With these and other objects in view, the invention consists in the novel construction, arrangement and combination of parts as will be hereinafter specifically described, claimed and illustrated in the accompanying drawings, in which, Figure 1 represents a side elevation, partly broken away, of the grease gun, Fig. 2 represents a horizontal sectional view on the line 2—2 of Fig. 1, Fig. 3 represents a top plan view of the gun, Fig. 4 represents a vertical sectional view on the line 4—4 of Fig. 3, and, Fig. 5 represents a side elevation, partly broken away, of the pump showing the piston in elevated inoperative position.

Referring to the drawing in detail, wherein similar reference numerals designate corresponding parts throughout the several views, the numeral 5 indicates a stand having a circular central portion 6 formed with an annular depression constituting a seat for the cylinder 7 and having radially projecting legs provided at their outer extremities with suitable casters 8 whereby the grease gun may be quickly and conveniently moved from one place to another. The bottom 6 of the cylinder is formed with a suitable opening communicating with a coupling 9 adapted to be connected with a suitable flexible tube 10 carrying at its opposite extremity a suitable nozzle (not shown). An annular member 11 is secured over the top edge of the cylinder 7 by suitable bolts 12 connecting said member and the base or stand 5.

The member 11 is provided with an upstanding shaft 13 receiving the vertically disposed arm 14 of the L-shaped bracket, the other arm 15 of which is disposed in a horizontal plane and reduced at its free extremity. At a point on the annular member 11 diametrically opposite the shaft 13, an arm 16 is provided thereon carrying a pivoted U-shaped member 17 adapted to engage over the reduced end on the arm 15 to lock the latter against pivotal movement on the shaft 13.

The horizontally disposed arm 15 is provided centrally with a vertically disposed threaded opening receiving the threaded rod 18 rotatably mounted in the piston 19 working within the cylinder 7. The upper end of the piston rod 18 carries a relatively non-rotatable hand wheel 20 preferably provided with an operating crank arm 21. For filling the cylinder 8 with oil or grease or any other material the U-shaped member 17 is swung outwardly to the position shown in Fig. 5, and the L-shaped bracket 14 is swung outwardly on the shaft 13 to remove the piston 19 from its normal position in alinement with the cylinder 7.

A rod 22 is secured to the top of the piston 19 and extends upwardly in parallel relation to the threaded piston rod 18 to a point in proximity to the hand wheel 20. An indicating sleeve 23 is adjustable on the rod 22 and is provided with suitable markings 24 and is formed in its lower end with longitudinal slits and screw threads. A jam nut 25 preferably provided with a suitable handle is fitted on the threaded end of the sleeve 23 and is adapted to be advanced on the threads of said sleeve to lock the latter against longitudinal sliding movement on the rod 22. A suitable hand or pointer 26 is rigidly secured to the arm 15 or formed integral therewith and is slidably engaged with the sleeve 23.

For ejecting the grease or other contents in predetermined quantities, as for filling the differential of an automobile or other casing, the sleeve 24 is adjusted on the rod 22, as illustrated in Fig. 1, so that the pointer or hand 26 is opposite the zero mark on the sleeve and the latter is subsequently secured in adjusted position by the nut 25. The hand wheel is then rotated to eject the grease from the cylinder 7 and the quantity ejected may be readily ascertained by referring to the movement of the sleeve 24 with relation to the hand or pointer 26. It will be understood that each time a portion of the contents of the cylinder 7 is ejected the sleeve 24 may be adjusted on the rod 22 so as to accurately indicate the quantity of the contents ejected at each operation.

What we claim is:—

1. In combination, a cylinder, a piston slidable therein, and a rod rotatably secured concentrically to said piston, a second rod secured to said piston extending parallel to the first mentioned rod, a sleeve adjustable on the second mentioned rod, means for securing said sleeve in adjusted position on said rod, said sleeve having suitable markings thereon, and a pointer fixed relative to said cylinder and engaging said sleeve.

2. In combination, a cylinder, a piston slidable in said cylinder, a piston rod rotatably secured on said piston, a bar fixed on said cylinder and movably receiving said piston rod, a second rod secured to said piston in spaced parallel relation to said piston rod, an indicating sleeve adjustable longitudinally on said second mentioned rod and having suitable markings thereon, means for securing said indicating sleeve against longitudinal movement on said rod, and a pointer rigidly secured to said bar adapted to coöperate with the markings on said sleeve to indicate the quantity of material ejected from said cylinder.

In testimony whereof we affix our signatures in presence of two witnesses.

HELMER O. EKERN.
WILLIAM L. EKERN.

Witnesses:
FREDERICK A. WARREN,
OLIVE M. ANDERSON.